United States Patent [19]

Sugitani et al.

[11] Patent Number: 4,670,642

[45] Date of Patent: Jun. 2, 1987

[54] METHOD AND AN APPARATUS FOR AUTOMATICALLY SETTING THE WEAVING REVERSING POSITION

[75] Inventors: Yuji Sugitani; Naohiro Tamaoki, both of Tsu, Japan

[73] Assignee: Nippon Kokan Kabushiki Kaisha, Tokyo, Japan

[21] Appl. No.: 780,085

[22] Filed: Sep. 25, 1985

[30] Foreign Application Priority Data

Oct. 30, 1984 [JP] Japan .................. 59-226852

[51] Int. Cl.⁴ .................................. B23K 9/12
[52] U.S. Cl. ...................... 219/125.12; 219/124.34
[58] Field of Search ............. 219/125.12, 124.22, 219/124.34, 60 R

[56] References Cited

U.S. PATENT DOCUMENTS

| | | | |
|---|---|---|---|
| 3,646,309 | 2/1972 | Smith, Jr. et al. | 219/60 R |
| 4,158,124 | 6/1979 | Connell | 219/125.12 |
| 4,394,559 | 7/1983 | Nomura et al. | |
| 4,417,128 | 11/1983 | Nomura et al. | 219/125.12 |
| 4,434,352 | 2/1984 | Nomura et al. | 219/125.12 |
| 4,531,192 | 7/1985 | Cook | 219/124.22 |

FOREIGN PATENT DOCUMENTS 573462 2/1979 Japan .

Primary Examiner—Clifford C. Shaw
Attorney, Agent, or Firm—Fleit, Jacobson, Cohn & Price

[57] ABSTRACT

A method and an apparatus for automatically setting the weaving reversing position in automatic arc welding wherein the welding electrode is subjected to weaving within the extent of the welding groove or bevel.

The position of reversing the electrode weaving direction is set by using a mean value of the height levels of the welding electrode subjected to weaving along the groove bottom transversely of the proceeding direction of welding. In this manner, the weaving reversing position is stabilized to promote the formation of the optimum welding bead.

3 Claims, 5 Drawing Figures

METHOD AND AN APPARATUS FOR AUTOMATICALLY SETTING THE WEAVING REVERSING POSITION

BACKGROUND OF THE INVENTION

This invention relates to a method and an apparatus for automatically setting the weaving reversing position in automatic arc welding wherein the electrode is subjected to weaving or to-and-fro oscillating movement within the transverse extent of the welding groove or bevel.

DESCRIPTION OF THE PRIOR ART

In automatic arc welding, in which the electrode is moved to and fro or weaved within the welding groove or bevel transversely of the weld line, that is, the proceeding direction of welding, the electrode is subjected to both weaving and vertical movements within the transverse extent of the welding groove or bevel in such a manner that a constant arc voltage from the constant current source or a constant arc current from the constant voltage source is maintained across the arc gap.

In such automatic arc welding, the reversing position of the electrode weaving is determined by holding as reference position the lowest position assumed by the electrode during right-and-left transverse movement within the welding groove or bevel, and setting as weaving reversing position a position of a preset height level above said lowest position, as shown for example in the Japanese Patent Publication No. 3462/1982.

However, when the electrode height is sporadically lowered due to momentary changes in the trajectory of the electrode tip, the momentarily changed lowest electrode position is occasionally held as said reference position. This causes fluctuations in the weaving reversing position thus affecting weaving stability.

SUMMARY OF THE INVENTION

It is a principal object of the present invention to overcome the above described drawbacks of the conventional method for automatically setting the weaving reversing position and to provide a method and an apparatus for automatically setting the stable reversing position despite sporadic changes in the electrode height above the groove bottom.

For achieving such object, the present invention provides a method for setting the weaving reversing position, according to which the electrode height is sampled at regular intervals from the central weaving point of the preceding weaving to a position inwardly a constant distance from the terminal weaving point of the preceding weaving to find a mean electrode height between said central and terminal points and to set a position a preset height above said mean height as weaving reversing position.

According to one aspect of the present invention, there is provided a method for automatically setting the weaving reversing position, in which, as the instantaneous weaving positions of the electrode are sensed in the form of the numbers of revolutions of the electric motor for electrode weaving drive, the instantaneous electrode height levels are sensed in the form of chlonologically changing voltage signals so as to find the mean electrode height level on the basis of these voltage signals to find the weaving reversing position on the basis of said mean height level.

According to the present invention, since the reversing position of electrode weaving is set by using the mean height of the welding electrode travelling along the transverse extent of the welding groove or bevel, an averaged reversing position can be automatically set despite sporadic changes in the electrode height during welding, thus leading to stable electrode weaving and hence to formation of the optimum welding bead.

The above and other objects, features and advantages of the invention will become more apparent from the following description taken in conjunction with the accompanying drawings.

DETAILED DESCRIPTION OF THE PREFERRED EMBODIMENTS

Figure 4:
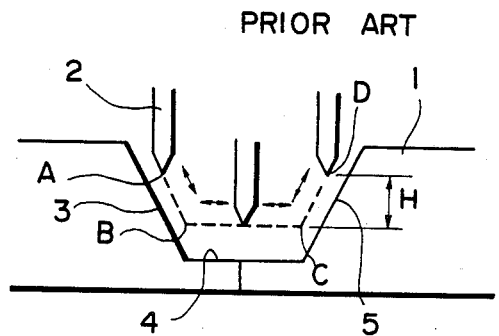
FIG. 4 is a diagrammatic view showing the principle of the prior-art method for automatically setting the weaving reversing position.
Figure 5:
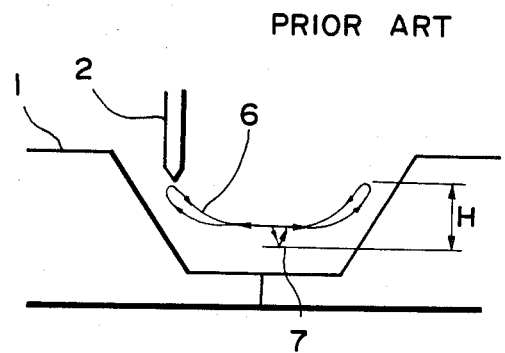
FIG. 5 is a diagrammatic view showing the trajectory of the electrode tip according to the prior-art method for setting the weaving reversing position.

Before describing the preferred embbdiments of the present invention, the prior-art method of automatically setting the reversing position of electrode weaving is explained by referring to FIGS. 4 and 5.

In FIG. 4, the numeral 1 designates the base metal and the numeral 2 an electrode placed opposite to the surface of the welding bevel or groove of the base metal. During welding, the electrode height in vertically changed so that a predetermined arc voltage from a constant current source or a predetermined arc current from a constant voltage source will be maintained across the arc gap.

Accordtng to this prior-art welding method, welding of the base metal 1 is performed by welding from an arbitrary point A to a point B along one inclined bevel surface 3, then to a point C along the bevel bottom 4 and then along the other inclined bevel surface 5, while the height of the electrode 2 is vertically adjusted so that the arc voltage or current will be maintained at a constant level. The weaving direction of the electrode 2 is reversed when the electrode reaches a predetermined height H. In such weaving method, the lowest position assumed by the electrode during the rightward or leftward movement thereof is held as a reference point and a position a predetermined height H above the reference point is set as the reversing position of electrode weaving.

Hence, when the trajectory 6 of the tip of the electrode 2 is momentarily changed as shown in FIG. 5 so that the tip of the electrode 2 is lowered to a point 7, such transient position 7 is occasionally held as the lowest position. In such case, since the weaving reversing position is determined by using such sporadic position as the reference point, the weaving reversing position is fluctuated by transient or sporadic changes in the trajectory of the electrode tip, with the result that the weaving of the electrode 2 unavoidably becomes unstable.

Figure 1:
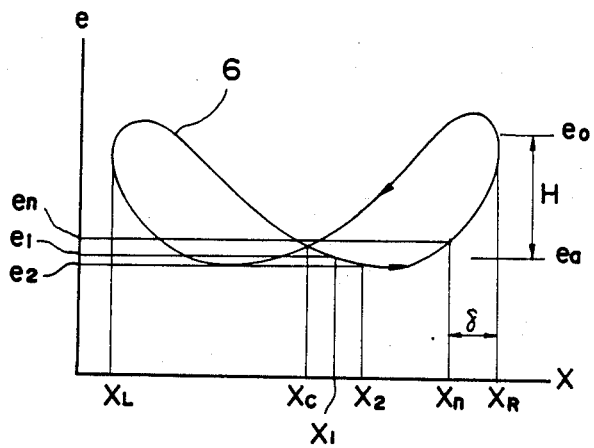
FIG. 1 is a chart showing the trajectory of the tip of the electrode weaved within the welding groove for automatic arc welding.
Figure 2:
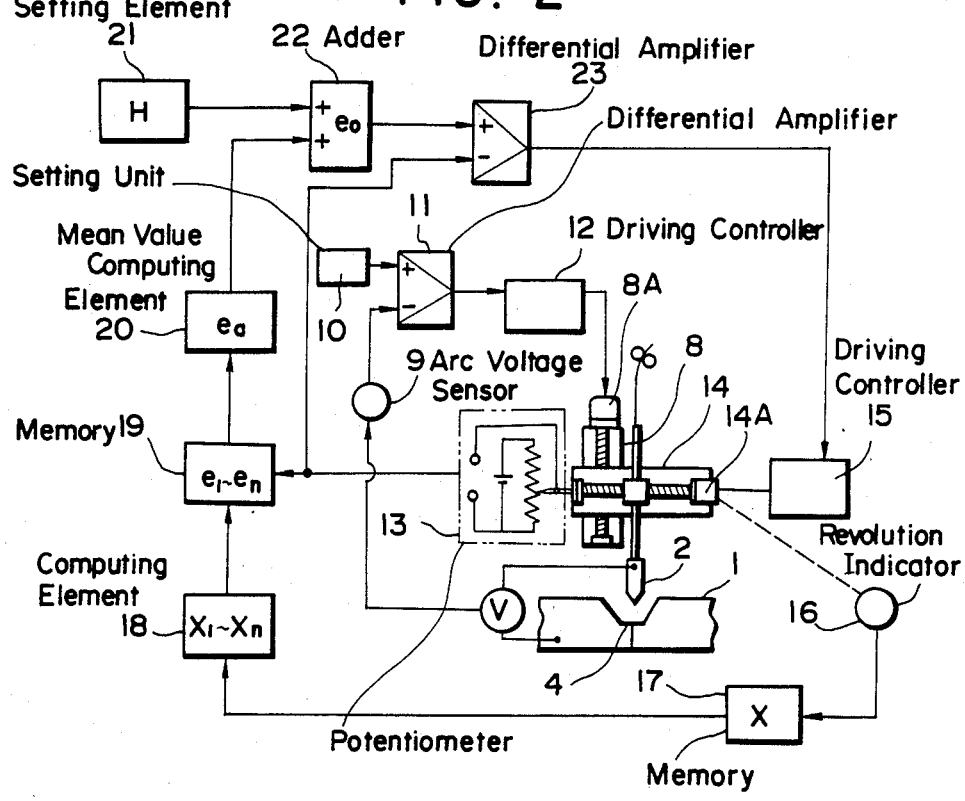
FIG. 2 is a block diagram showing the construction of the control system for automatically setting the weaving reversing position when the welding is performed with the constant arc voltage.

Reference is now made to FIGS. 1 and 2 showing certain preferred embodiments of the present invention.

FIG. 1 is a chart showing an example of the trajectory 6 of the end part or tip of an electrode that is weaved in a bevel or groove in the base metal. In the chart, the weaving position x of the electrode is plotted on the abscissa and the electrode height e on the ordinate. In FIG. 1, XL, XR denote the terminal electrode positions in the course of the preceding weaving and XC denotes the central weaving position in the course of the preceding weaving.

The electrode height e of the preceding weaving is sampled n times at regular intervals from the central weaving position Xc of the preceding welding to the position $X_n$ inwardly a preset distance δ from one of the terminal weaving position, such as the position XR. The preset distance δ is a function of the welding groove profile. Then, a mean value $e_a$ of the electrode height levels $e_1$ to $e_n$ at the sampling positions $X_1$ to $X_n$ is found. Then, an electrode height $e_o$ higher a preset height H than the mean value $e_a$ is found and the weaving position of the electrode corresponding to the electrode height $e_o$ is used as the weaving reversing position for controlling the electrode weaving in the welding groove or bevel.

The manner of controlling the weaving reversing position shown in FIG. 1 is now described by referring to FIG. 2. In FIG. 2, the numeral 1 denotes the base metal and the numeral 2 an electrode facing to a bevel or groove in the base metal 1. The numeral 4 denotes the groove bottom, the numeral 8 an electrode lifting unit provided to a welder for lifting or lowering the electrode 2, the numeral 8A a driving electric motor for the unit 8, the numeral 14 a weaving unit for weaving the electrode 2, and the numeral 14A a driving electric motor for the weaving unit 14.

During welding, in order to provide a constant arc voltage V between the electrode 2 and the base metal 1, the electrode 2 is raised or lowered by the unit 8 as a function of changes in the vertical height of each welding point from the groove bottom 4 for perpetually maintaining a constant arc length. That is, an arc voltage $\overline{V}$ is sensed by an arc voltage sensor 9, and the arc voltage signal from the sensor 9 is supplied to a differential amplifier 11. In the differential amplifier, the deviation between the sensed arc voltage signal and the reference arc voltage signal previously stored in a setting unit 10 is found and supplied to a driving controller 12. In the controller 12, the motor 8A for the unit 8 is driven into operation responsive to the input deviation signal for lifting or lowering the electrode 2 so as to reduce the deviation at all times to nil. Any changes in the electrode height thus caused by the vertical electrode movement is sensed by a potentiometer 13 as chronogically changing voltage signals, these signals being then stored in a memory 19.

On the other hand, the weaving movement of the electrode 2 is carried out by driving the weaving electric motor 14A of the weaving unit 14 at a constant speed by a driving controller 15. The number of revolutions of the motor 14A is sensed by a revolution indicator 16 and the electrode weaving positions X obtained in terms of the numbers of revolutions of the motor 14A are sequentially stored in a memory 17. The weaving positions X assumed by the electrode 2 during the preceding weaving and sequentially stored in the memory 17 are issued to a computing element 18. In the computing element 18, the central weaving position $X_c$ and the respective terminal positions $X_R$, $X_L$ of the electrode are computed, at the same time that the respective sampling position signals $X_1$ to $X_n$ are computed from the central position $X_c$ and one of the terminal positions, such as $X_R$.

The respective sampling position signals $X_1$ to $X_n$ computed by the element 18 are supplied to the memory 19 which then supplies to a mean value computing element 20 electrode height voltage signals $e_1$ to $e_n$ corresponding to the respective sampling position signals $X_1$ to $X_n$. In the mean value computing element 20, an operation $$e_a = \frac{1}{n} \sum_{i=1}^{n} e_i$$

is performed on the basis of the electrode height voltage signals to find a mean value $e_a$ of the electrode height positions corresponding to the respective sampling position signals $X_1$ to $X_n$. The mean value $e_a$ thus found is supplied to an adder 22.

In the adder 22, to the mean value $e_a$ of the electrode height levels is added a preset constant height signal H previously stored in the setting element 21. The resulting electrode height level $e_o$ corresponding to the weaving reversing position is supplied to a differential amplifier 23. In the amplifier 23, any deviation between the electrode height signal $e_o$ corresponding to the weaving reversing position and the electrode height signals sequentially or continuously supplied by the potentiometer 13 is found and the resulting deviation signal is supplied to the driving controller 15. The driving controller 15 operates to reverse the weaving direction of the electrode 2 when the deviation signal is reduced to zero.

The above described sequences are repeated at the left and right extremities within the groove to effect stable weaving of the electrode 2. Although the foregoing description has been made of the case of welding with a constant arc voltage, the weaving reversing position can be similarly set in the case of welding with a constant arc current.

Figure 3:
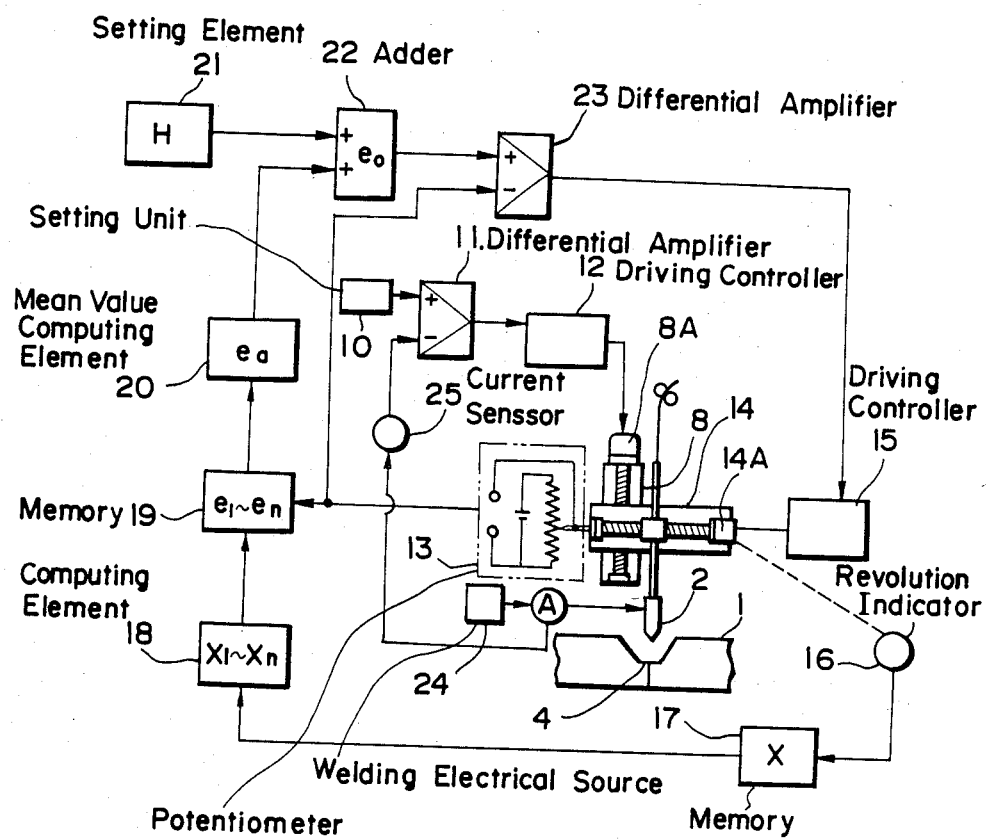
FIG. 3 is a block diagram showing the construction of the control system for automatically setting the weaving reversing position when the welding is performed with the constant arc current.

FIG. 3 is an overall schematic block view showing a control system for automatically setting the weaving reversing position in the case of welding with a constant arc current. In FIG. 3, the same numerals are used to depict parts or components similar to those shown in FIG. 2 and the corresponding description is omitted. Referring to FIG. 3, the arc current A flowing from a welding electrical source 24 to the base metal 1 through the electrode 2 is sensed by a current sensor 25 and the electrode 2 is lifted or lowered by the electrode lifting unit 8 so as to maintain the thus sensed arc current A at a constant value. Any changed in the electrode height caused by such vertical electrode movement is continuously sensed by the potentiometer 13 and the thus sensed electrode height data are utilized for setting the reversing position of electrode weaving similarly to the preceding embodiment.

What is claimed is:

1. In a method of automatically setting the weaving reversing position wherein an electrode is weaved transversely with respect to the proceeding direction of welding whilst the electrode height is vertically adjusted in the welding groove for maintaining a constant arc voltage or a constant arc current, and wherein the electrode weaving direction is reversed when the electrode has reached a predetermined height, the improvement comprising the steps of:

sampling the electrode height at predetermined intervals from the central position of the preceding weaving to a position inwardly a predetermined distance from the terminal position of the preceding weaving;

finding the mean value of the sampled electrode height level values at said intervals; and reversing the direction of electrode weaving at a predetermined height above the mean height level.

2. In an apparatus for automatically setting the weaving reversing position, said apparatus having lifting means for lifting or lowering an electrode mounted in opposition to a base metal;

weaving means provided with a driving motor for weaving the electrode transversely with respect to the welding direction; an arc voltage sensor for sensing the arc voltage between the electrode and the base metal; a differential amplifier for finding the deviation between the arc voltage signal sensed by said arc voltage sensor and a reference voltage signal; setting means for setting the reference voltage to said differential amplifier; and a driving controller for driving said lifting means so that deviation signals found at the differential amplifier are reduced to zero, wherein the electrode is weaved in the welding groove transversely with respect to the welding direction by said weaving means, whilst the electrode height is varied so that the arc voltage will be maintained as a constant value, the weaving direction of the electrode being reversed when the electrode has reached a predetermined height, the improvement comprising:

(a) revolution indicator means (16) for sensing the number of revolutions of the driving motor (14A) of the weaving means (14) for continuously sensing the weaving positions (X) of the electrode (2);

(b) first memory means (17) for storing the weaving positions of the electrode (2) sensed by the revolution indicator means (16);

(c) computing means (18) for computing, from the electrode weaving position data of the preceding weaving stored in said first memory means (17), the central weaving position as well as terminal weaving positions of the electrode (2) during the preceding weaving, dividing at predetermined intervals a transverse distance from said central weaving position to a position transversely inwardly of one of said terminal weaving positions for computing sampling position signals $(X_1-X_n)$;

(d) potentiometer means (13) attached to said lifting means (8) for chronologically sensing height levels of the electrode (2) being lifted or lowered for outputting corresponding voltage signals;

(e) second memory means (19) for storing said voltage signals from said potentiometer means (13) corresponding to the instantaneous electrode height levels, receiving said sampling position signals from said computing means (18) for supplying sampled voltage signals $(e_1-e_n)$ representative of the electrode height levels associated with said sampling position signals $(X_1-X_n)$ respectively;

(f) mean value computing means 20 for computing a mean value $(e_a)$ of said sampled voltage signals $(e_1-e_n)$ supplied from said second memory means (19);

(g) adding means (22) for adding to said mean value $(e_a)$ from said mean value computing means (20) a constant height signal previously presented from said setting means (21) for deriving an electrode height signal $(e_o)$ representative of the weaving reversing position;

(h) differential amplifier means (23) for finding a deviation between the electrode height signal $(e_o)$ from said adding means (22) and the voltage signals continuously supplied from said potentiometer means (13); and (i) driving controller means (15) for receiving deviation signals from said differential amplifier means (23) and outputting reversing signals for reversing the rotational direction of the weaving driving motor of the weaving means (14) when said deviation signals are reduced to zero.

3. In an apparatus for automatically setting the weaving reversing position, said apparatus having lifting means for lifting or lowering an electrode mounted in opposition to a base metal; weaving means provided with a driving motor for weaving the electrode transversely with respect to the welding direction; an arc current sensor for sensing the arc current flowing in said electrode and the base metal; a differential amplifier for finding the deviation between the arc current signal sensed by said arc current sensor and a reference current signal; setting means for setting the reference current signal to said differential amplifier; and a driving controller for driving said lifting means so that deviation signals found at the differential amplifier are reduced to zero, wherein the electrode is weaved transversely in the welding groove with respect to the welding direction by said weaving means, whilst the electrode height is varied so that the arc current will be maintained at a constant value, the weaving direction of the electrode being reversed when the electrode has reached a predetermined height, the improvement comprising:

(a) revolution indicator means (16) for sensing the number of revolutions of the driving motor (14A) of the weaving means (14) for continuously sensing the weaving positions (X) of the electrode (2);

(b) first memory means (17) for storing the weaving positions of the electrode (2) sensed by the revolution indicator means (16);

(c) computing means (18) for computing, from the electrode weaving position data of the preceding weaving stored in said first memory (17), the central weaving position as well as terminal weaving positions of the electrode (2) during the preceding weaving, dividing at predetermined intervals a transverse distance from said central weaving position to a position transversely inwardly of one of said terminal positions for computing sampling position signals $(X_1-X_n)$;

(d) potentiometer means (13) attached to said lifting means (8) for chronologically sensing height levels of the electrode (2) being lifted or lowered for outputting corresponding voltage signals;

(e) second memory means (19) for storing said voltage signals from said potentiometer means (13) corresponding to the instantaneous electrode height levels, receiving said sampling position signals from said computing means (18) for supplying sampled voltage signals $(e_1-e_n)$ representative of the electrode height levels associated with said sampling position signals ($X_1$-$X_n$), respectively;

(f) mean value computing means (20) for computing a mean value ($e_a$) of said sampled voltage signals ($e_1$-$e_n$) supplied from said second memory means (19);

(g) adding means (22) for adding to said mean value ($e_a$) from said mean value computing means (20) a constant height signal previously presented from said setting means (21) for deriving an electrode height signal ($e_o$) representative of the weaving reversing position;

(h) differential amplifier means (23) for finding a deviation between the electrode height signal ($e_o$) from said adding means (22) and the voltage signals continuously supplied from said potentiometer means (13); and (i) driving controller means (15) for receiving deviation signals from said differential amplifier means (23) and outputting reversing signals for reversing the rotational direction of the weaving driving motor of the weaving means (14) when said deviation signals are reduced to zero.

* * * * *